May 14, 1940. M. PRÜSS ET AL 2,200,580
PURIFICATION OF LIQUIDS BY BIOLOGICAL MEANS
Filed Feb. 12, 1938
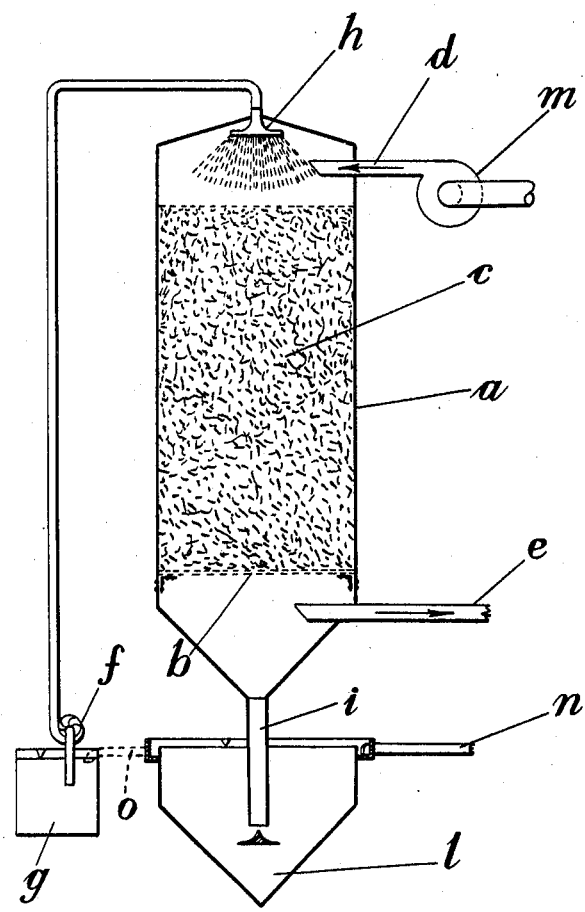
Max Prüss
and
Henrich Blunk
by
Dean Fairbank & Hirsch Patented May 14, 1940

2,200,580

UNITED STATES PATENT OFFICE 2,200,580

PURIFICATION OF LIQUIDS BY BIOLOGICAL MEANS

Max Prüss and Heinrich Blunk, Essen-Ruhr, Germany

Application February 12, 1938, Serial No. 190,290
In Germany December 24, 1934

2 Claims. (Cl. 210—7)

This invention relates to the purification by bacteriological treatment of watery liquid, such for example as industrial trade wastes and sewage and this application is a continuation, in part, of applicants' prior application, Serial No. 54,957, filed December 17, 1935.

It is well known to treat sewage by means of an open bacteriological filter, in which the impure water is caused to trickle down through a mass of broken stone or other supporting media providing a number of interstices, to which air under atmospheric pressure is admitted. As the consequence there forms on the support a film of aerobic micro-organisms which retain and consume the organic matter in the impure water, and thereby destroy it. However, a very serious defect of that kind of bacteriological filter is that it gives off stench and provides a breeding ground for multitudes of flies. It has also been found that present filters are much less efficient than they might be owing to insufficient oxygen reaching the bacteriological film and consequent failure to maintain, in a healthy condition, all the micro-organisms that the filter is capable of accommodating.

It has previously been proposed to mitigate the nuisances mentioned and to increase the efficiency of the filter by covering in the filter and providing a closed circuit by means of which air is continuously circulated through the filter in the opposite direction to that of the water to be treated; a sufficiency of fresh air being admitted to the circuit and the air discharged from the circuit being chemically de-odorized.

It is the object of the present invention to provide a process and apparatus whereby the stench and fly nuisances are definitely avoided and the efficiency of the bacteriological treatment is considerably improved.

According to the present invention, in a process for the bacteriological treatment of organically impurified watery liquid comprising the trickling of the impure liquid downward through a bacterially active contact mass in which an oxygen-containing gas such as air is present, the process is conducted within an enclosure; the gas is forced through the contact mass under controlled pressure and volume so as to be calculated to reach all parts of the contact mass; the gas flow is downward through the mass; and separation of the gas from the liquid is effected below the mass where the liquid has been purified, whereby contamination of the separating air by contact with untreated water is avoided. No very high pressure of the air or other gas is required, it having been found for example in one plant where the invention has been applied, that a pressure of 2" water gauge above the filter bed gives very much more satisfactory results than a 10" water gauge suction working against the resistance of the depth of the filter.

The process will be further described with reference to the apparatus shown schematically in the accompanying drawing.

Referring to the accompanying drawing which is a vertical cross section of a suitable percolating filter, $a$ is closed container having near the bottom a perforated plate, screen or grid $b$ on which the filling material or packing $c$ rests, which may consist of broken stone, porcelain rings or the like. The water to be purified is pumped from a tank $g$, by means of pump $f$, to the spraying nozzle $h$. The air or other oxygen-containing gas for the purpose of maintaining bacteriological activity, is blown in by a suitable fan $m$ by pipe $d$, and is forced downwards through the filling material in close contact with and in the same direction as the water to be purified, which is sprayed on to the filling material from the nozzle $h$. The air or gas being positively fed to the apparatus, its volume and rate of supply can be regulated so as to ensure that it penetrates to all parts of the contact mass, and thus maintains the later in a high state of activity. The air or gas issues from the pipe $e$, purified, having separated from the liquid at the bottom of the filter, where the liquid itself is purified and the air or gas then passes away by the discharge pipe $e$ without being contaminated by coming into contact with incoming impure liquid. A screen or the like means may be used to remove from the gaseous products flowing through the pipe $e$ any flies which may have escaped alive from the filter. The purified liquid passes out through the pipe $i$ into settling tank $l$, where it deposits the oxydised matter, and dead organisms, which are removed from the bottom of tank $l$ whenever required. The clarified effluent overflows the lip of the tank $l$ and is run off by pipe $n$.

In some cases, a portion of the purified effluent may be taken from the tank $l$ to the tank $g$ for dilution of the raw unfiltered water as shown in dotted lines at $o$. In this case, the rate of pumping by pump $f$ is proportionately increased.

With a view to preventing the growth of moulds and algae in the interstices in the filter, sulphuretted hydrogen may be forced into the upper end of the chamber $a$ with the air or other oxygen-containing gas, by the pipe *d* or by another channel if more convenient, and the passage of the sulphuretted hydrogen through the filter renders it inodorous and the gaseous mixture leaving the apparatus by the pipe *e* is quite inoffensive. The stench given off by the liquid distributed over the top of the filter fouls the air that is being forced into the chamber, but the air in spite of being rendered malodorous in this way is rendered innocuous by passing down through the filter bed.

It will be understood therefore that, with the apparatus described it is possible to carry out simultaneously with the purification of impure liquids, the deodorising of malodorous gases by freeing them from noxious organic constituents.

We claim:

1. A process for purifying a liquid and any malodorous gases given off by said liquid, which consists in maintaining a closed space above a biological filter bed, forcing the liquid into said closed space, distributing said liquid over said filter bed, forcing an oxygen-containing gas into said space under superatmospheric pressure whereby the liquid, said oxygen-containing gas, and any malodorous gases given off by said liquid travel confluently downwardly through said filter bed, and the liquid and said malodorous gases are simultaneously purified in said bed, and separating the purified liquid and the gases below said bed.

2. The process as defined in claim 1 in which hydrogen sulphide is delivered under superatmospheric pressure to said closed space in addition to the liquid to be purified and the oxygen-containing gas, thereby preventing the growth of moulds, algae, and the like on the filter bed.

MAX PRÜSS.
HEINRICH BLUNK.